United States Patent [19]  [11] 4,144,082
Simic  [45] Mar. 13, 1979

[54] SULFUR PLASTICIZING COMPOSITION

[75] Inventor: Milutin Simic, Novato, Calif.

[73] Assignee: Chevron Research Company, San Francisco, Calif.

[21] Appl. No.: 853,015

[22] Filed: Nov. 17, 1977

[51] Int. Cl.$^2$ .................. C07G 17/00; C09K 3/00
[52] U.S. Cl. ...................... 106/287.24; 106/287.32
[58] Field of Search ............... 106/287 SC; 423/567

[56] References Cited

U.S. PATENT DOCUMENTS

| | | | |
|---|---|---|---|
| 3,306,000 | 2/1967 | Barnes | 106/287 SC |
| 3,674,525 | 7/1972 | Louthan | 106/287 SC |
| 3,954,685 | 5/1976 | Woo | 260/2.5 R |
| 3,960,585 | 6/1976 | Gaw | 106/274 |
| 4,011,179 | 3/1977 | Woo et al. | 260/2.5 R |
| 4,026,719 | 5/1977 | Simic | 106/287.24 |

*Primary Examiner*—Theodore Morris
*Attorney, Agent, or Firm*—D. A. Newell; John Stoner, Jr.; A. T. Bertolli

[57] ABSTRACT

A sulfur plasticizing composition comprising an aromatic polymeric polysulfide, a linear aliphatic polysulfide and an olefinic-type unsaturated carboxylic acid. The presence of unsaturated acid moderates the evolution of hydrogen sulfide when the plasticizing composition is reacted with sulfur, thereby preventing a rapid, uncontrolled degassing of the reaction mixture.

16 Claims, No Drawings

SULFUR PLASTICIZING COMPOSITION

BACKGROUND OF THE INVENTION

This invention concerns sulfur plasticizing compositions which comprise both an aromatic polysulfide and a linear aliphatic polysulfide. In particular, this invention concerns the use of olefinic-type unsaturated carboxylic acids to moderate hydrogen sulfide evolution during the reaction of sulfur with sulfur plasticizing compositions comprising both an aromatic and a linear aliphatic polysulfide.

Elemental sulfur has been proposed for use in a variety of applications such as coatings, foams, adhesives, and the like, but the development of many of these applications has been hindered by the propensity of sulfur to revert rapidly to its crystalline form. Many additives have been suggested to modify elemental sulfur to produce sulfur-based materials with "plastic" properties. Nearly all of these plasticizers are polysulfides.

The aromatic polysulfides and the linear aliphatic polysulfides are two of the most widely used classes of sulfur plasticizers. U.S. Pat. No. 4,026,719, granted May 31, 1977, describes sulfur-based compositions containing a mica filler and a plasticizing material which have been found to be unexpectedly strong. One of the recommended plasticizing materials comprises a mixture of aromatic and aliphatic polysulfides.

Aromatic polysulfide sulfur plasticizers are generally prepared by the base-catalyzed reaction of an aromatic compound and sulfur. In some instances, the reaction product is neutralized with acid, but in many cases the unneutralized product is used in combination with a linear aliphatic polysulfide. It has been found that, when a sulfur-plasticizing composition comprising an unneutralized aromatic polysulfide prepared by base catalysis and a linear aliphatic polysulfide are contacted with molten elemental sulfur, hydrogen sulfide gas is evolved at such an extremely rapid rate that conventional gas scrubbers cannot function satisfactorily and some noxious fumes are liberated to the atmosphere.

The evolution of hydrogen sulfide gas, which occurs when the plasticizer composition is contacted with molten sulfur, significantly limits the manufacture of plasticizer compositions comprising an aromatic polysulfide and a linear aliphatic polysulfide.

SUMMARY OF THE INVENTION

It has been found that incorporating a small amount of an unsaturated carboxylic acid in sulfur plasticizer compositions comprising an aromatic polysulfide and a linear aliphatic polysulfide moderates the evolution of hydrogen sulfide which normally occurs when the plasticizing composition is contacted with molten sulfur. Thus, this invention encompasses sulfur plasticizing compositions comprising from about 5% by weight to about 80% by weight of an aromtic polysulfide, from about 5% by weight to about 80% by weight of a linear aliphatic polysulfide, and from about 0.1% by weight to about 10% by weight of an unsaturated carboxylic acid. Preferably the composition contains sufficient sulfur to form a solid mixture at ambient temperatures.

DETAILED DESCRIPTION OF THE INVENTION

As summarized above, the sulfur plasticizing compositions of the invention comprise three ingredients: an aromatic polysulfide, a linear aliphatic polysulfide, and an unsaturated carboxylic acid.

Aromatic polysulfides which are suitable for use in the platicizing composition include aromatic polysulfides formed by reacting one mol of an aromatic carbocyclic or heterocyclic compound, substituted by at least one functional group of the class —OH or —NHR in which R is hydrogen or lower alkyl, with at least two mols of sulfur. Suitable aromatic compounds of this type include phenol, aniline, N-methyl aniline, 3-hydroxy thiophene, 4-hydroxy pyridine, p-aminophenol, hydroxyquinone, resorcinol, meta-cresol, thymol, 4,4'-dihydroxy biphenyl, 2,2-di(p-hydroxyphenyl)-propane, dianiline, and the like. The reaction can be carried out by heating the sulfur and aromatic compound at a temperature of from about 120° C. to about 170° C. for 1 hour to 12 hours in the presence of a base catalyst such as sodium hydroxide. The polysulfide product made in this way has a mol ratio of aromatic compound to sulfur of about 1:2 to 1:10, usually 1:3 to 1:7.

Linear aliphatic polysulfides which are suitable for use in the plasticizing composition, although conventionally described as linear, may have some branching, indicated as follows:

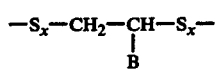

wherein x is an integer of from about 2 to about 6 and B is hydrogen, alkyl, halogen, nitrile, or ester or amide group. Thus, the sulfur-containing chain is linear, but can have side groups. The side group can, in fact, be an aromatic. For instance, styrene can be used to form a phenyl-substituted linear aliphatic polysulfide. However, the preferred linear aliphatic polysulfides include those containing an ether linkage having the recurring unit

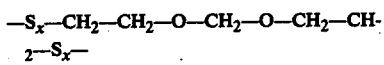

wherein x is an integer having an average value of about 12. The ether moiety of these polysulfides is relatively inert. These polysulfides, called Thiokols, are commercially available from the Thiokol Corporation, e.g., Thiokol LP-3. Other commercially available unbranched linear aliphatic polysulfides have the recurring units

from the reaction of an alpha, omega-dihaloalkane with sodium polysulfide,

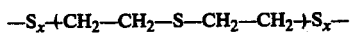

from the reaction of alpha, omega-dihalosulfides with sodium polysulfide, and

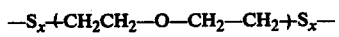

from the reaction of alpha, omega-dihaloesters with sodium polysulfide; wherein x is an integer from 2 to about 5 and y is an integer from 2 to about 10.

Unsaturated carboxylic acids which are suitable for use in the plasticizing composition are those mono- and di-carboxylic acids having olefinic-type unsaturation.

For instance, suitable unsaturated mono-carboxylic acids have the formula $$R_2C=CR-(R^1)_x-COOH$$

wherein each R is independently hydrogen, alkyl, or aryl; $R^1$ is alkylene or arylene and x is either 0 or 1. Thus, alkenyl-substituted benzoic acids are suitable. However, aliphatic acids are preferred, and alpha, beta-unsaturated aliphatic carboxylic acids are particularly preferred. It is also preferable to use low-molecular-weight acids containing from 3 to about 10 carbon atoms. Accordingly, acrylic acid is an especially preferred acid. Other specific acids which are suitable include, for example, crotonic acid, angelic acid, tiglic acid, undecylenic acid, alpha-methylacrylic acid, p-allyl benzoic acid, and cinnamic acid. Suitable dicarboxylic acids include maleic acid and fumaric acid.

The sulfur plasticizing composition is prepared by contacting the three ingredients in a suitable vessel. Since unreacted sulfur is usually present in both the aromatic and aliphatic polysulfides, it is a preferred practice to add the unsaturated acid to one or the other of the polysulfide ingredients before combining the polysulfides. The relative weight ratios of ingredients are not particularly critical, although it is preferable to use at least two equivalents of acid per mol of base catalyst used in the aromatic polysulfide preparation. In general, the plasticizing composition comprises from about 5% to 80%, by weight, of aromatic polysulfide, from about 5% to 80% by weight, of aliphatic polysulfide, and from about 0.1% to 10%, by weight, of unsaturated acid. Preferably the composition comprises from about 30% to 70%, by weight, of aromatic polysulfide, from about 5% to 60%, by weight, aliphatic polysulfide, and from 0.5% to 5%, by weight, of unsaturated acid. A particularly preferred composition comprises about 66%, by weight, of aromatic polysulfide, about 33%, by weight, of aliphatic polysulfide, and about 1%, by weight, of unsaturated acid.

The plasticizing composition may also comprise up to as much as about 90%, by weight, of various optional ingredients. For instance, the composition may comprise a substantial weight percent of sulfur; filler such as asbestos, talc, clay, fiberglass, or mica; pigment; viscosity modifier; or the like. In a preferred embodiment, the plasticizing composition is intended as a concentrate for use in the preparation of a sulfur-based coating composition. Accordingly, in addition to the three principal ingredients, the composition comprises elemental sulfur and a filler. For instance, the plasticizing composition may comprise from about 30% to 80%, by weight, of sulfur and from about 10% to 30%, by weight, of filler. When preparing an embodiment comprising substantial amounts of elemental sulfur, it is usually desirable to heat the sulfur above its melting point while adding the principal ingredients. In this way, the plasticizers combine with the sulfur, and when cooled form a solid material. The solid can be pulverized or broken into smaller lumps for use as a concentrate which when further diluted with additional sulfur forms a sulfur-based composition.

Among other factors, the present invention is based upon the discovery that a sulfur plasticizing composition comprising both an aromatic and aliphatic polysulfide is stabilized against the vigorous evolution of hydrogen sulfide gas by including an unsaturated acid in the composition. As an additional benefit, it has been found that the acid prevents fragmentation of the linear aliphatic polysulfide and has plasticizing properties of its own. While the actual mechanisms of the reactions have not been identified, it appears that hydrogen sulfide is produced by the reaction of sulfur with the end-groups of the aliphatic polysulfide and by the base catalyzed fragmentation of the linear aliphatic polysulfides. As a result, many available hydrogen atoms combine with sulfur to evolve hydrogen sulfide gas. An unsaturated acid, such as acrylic acid, will combine with sulfur to form a plasticized sulfur-bridged polysulfide:

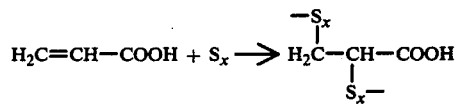

In addition, the acrylic acid neutralizes any base present in the system, further inhibiting the polysulfide fragmentation.

EXAMPLES

The following examples illustrate the preparation and use of specific embodiments of the composition of this invention. The examples are not intended to limit the scope of the invention, as other embodiments will be suggested by them.

EXAMPLE 1

The aromatic polysulfide, PSA, which was used as an ingredient in the following composition was prepared by the reaction of sulfur with phenol in the presence of a sodium hydroxide catalyst, as thoroughly discussed in U.S. Pat. No. 3,892,686, granted July 1, 1975 (see Example 1 at Cols. 13-14).

The aliphatic polysulfide, LP-3, which was used as an ingredient was commercially available from the Thiokol Corporation as Thiokol LP-3.

The composition was prepared by mixing elemental sulfur and PSA at 140° C.-145° C., acrylic acid was then added, and the mixture was allowed to react 60 to 90 minutes. LP-3 was added over a 20- to 30-minute period and allowed to react 30 minutes. The hydrogen sulfide gas was evolved slowly throughout the reaction. The composition was cast into 0.5- to 0.75-inch-thick layers and solidified in 3 to 4 hours.

| Ingredients | Plasticizing Composition Total Weight | Weight % |
|---|---|---|
| (1) Sulfur | 1200 lbs | 54.3 |
| (2) PSA | 800 lbs | 36.2 |
| (3) LP-3 | 200 lbs | 9.0 |
| (4) Acrylic acid | 10 lbs | 0.5 |
| | 2210 lbs | 100.0% |

The procedure of Example 1 was repeated except that there was no acrylic acid in the composition. After addition of the LP-3, an extremely vigorous reaction occurred and the resulting evolution of hydrogen sulfide gases was so violent that a portion of the reaction contents was blown out of the reactor.

At a later data, 5.5 parts of the plasticizing composition prepared with acrylic acid was added to 77.5 parts of sulfur and 17 parts of mica, and the resulting mixture was heated at 130°-150° C. for 30 minutes. The product was an excellent cement coating composition.

EXAMPLE 2

In this example, the aromatic polysulfide, PSA, was prepared as in Example 1 using a 30:70 phenol to sulfur weight ratio.

The composition was prepared by charging molten sulfur at 130° C. to a reaction vessel, adding PSA and acrylic acid, adding LP-3, holding at 120° C., adding mica, and allowing the composition to cool.

| Plasticizing Composition | |
|---|---|
| Ingredients | Weight % |
| (1) Sulfur | 49.7 |
| (2) PSA | 20.0 |
| (3) Mica | 20.0 |
| (4) LP-3 | 10.0 |
| (5) Acrylic acid | 0.3 |
| | 100.0% |

A portion of the sulfur plasticizing composition was used to prepare a sulfur-based coating by adding additional sulfur and mica to the plasticizing composition, which was heated to its molten state.

| Coating | |
|---|---|
| Ingredients | Weight % |
| (1) Sulfur | 74 |
| (2) Mica | 16 |
| (3) Plasticizing Composition | 10 |
| | 100% |

What is claimed is:

1. A sulfur plasticizing composition comprising (a) an aromatic polysulfide prepared by a base-catalyzed reaction of sulfur with an aromatic carbocyclic or heterocyclic compound substituted by at least one functional group of the class —OH or —NHR in which R is hydrogen or lower alkyl; (b) a linear aliphatic polysulfide; and (c) an olefinic-type unsaturated carboxylic acid.

2. A composition according to claim 1 comprising from about 5% to about 80%, by weight, of said aromatic polysulfide; from about 5% to about 80%, by weight, of said aliphatic polysulfide; and from about 0.1% to about 10%, by weight, of said carboxylic acid.

3. A composition according to claim 2 comprising from about 30% to about 70%, by weight, of said aromatic polysulfide; from about 5% to about 60%, by weight, of said aliphatic polysulfide; and from about 0.5% to about 5%, by weight, of said carboxylic acid.

4. A composition according to claim 1 additionally comprising from about 30% to about 80%, by weight, of sulfur; and from about 10% to about 30%, by weight, of mica.

5. A composition according to claim 1 wherein said aliphatic polysulfide is unbranched.

6. A composition according to claim 5 wherein said unbranched aliphatic polysulfide contains ether linkages.

7. A composition according to claim 6 wherein said unbranched aliphatic polysulfide contains the recurring unit

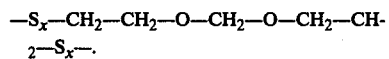

8. A composition according to claim 1 wherein said carboxylic acid is aliphatic.

9. A composition according to claim 8 wherein said aliphatic carboxylic acid is an alpha,beta-unsaturated acid.

10. A composition according to claim 9 wherein said alpha,beta-unsaturated aliphatic carboxylic acid contains from 3 to about 10 carbon atoms.

11. A composition according to claim 10 wherein said carboxylic acid is acrylic acid.

12. A composition according to claim 1 wherein said aromatic compound is phenol.

13. A sulfur plasticizing composition comprising: (1) about 49.5%, by weight, of sulfur; (2) about 20%, by weight, of an aromatic polysulfide prepared by a base-catalyzed reaction of sulfur and an aromatic carbocyclic or heterocyclic compound substituted by at least one functional group of the class —OH or —NHR in which R is hydrogen or lower alkyl; (3) about 10%, by weight, of a linear aliphatic polysulfide containing the recurring unit

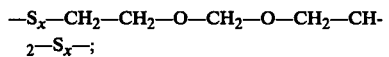

(4) about 20%, by weight, of mica; and (5) about 0.5% of acrylic acid.

14. In a process of preparing a sulfur plasticizing composition by reacting in the presence of excess sulfur (a) molten sulfur, (b) a linear aliphatic polysulfide and (c) an aromatic polysulfide prepared by a base-catalyzed reaction of sulfur and an aromatic carbocyclic or heterocyclic compound substituted by at least one functional group of the class —OH or —NHR in which R is hydrogen or lower alkyl, the mol ratio of aromatic compound to sulfur being about 1:2 to 1:10, the improvement which comprises reacting (a), (b) and (c) in the presence of a small amount sufficient to moderate hydrogen sulfide evolution of an olefin-type unsaturated carboxylic acid plasticized sulfur-bridged polysulfide.

15. The improvement according to claim 14 wherein the olefin-type unsaturated carboxylic acid used in forming the sulfur-bridged polysulfide is an alpha,beta-unsaturated aliphatic acid containing 3 to about 10 carbon atoms.

16. The improvement according to claim 15 wherein the alpha,beta-unsaturated aliphatic acid is acrylic acid.

* * * * *

UNITED STATES PATENT AND TRADEMARK OFFICE
CERTIFICATE OF CORRECTION

PATENT NO. : 4,144,082
DATED : March 13, 1979
INVENTOR(S) : MILUTIN SIMIC

It is certified that error appears in the above-identified patent and that said Letters Patent are hereby corrected as shown below:

Column 1, line 58, "aromtic" should read --aromatic--.

Column 2, line 4, "platicizing" should read --plasticizing--.

Column 4, line 64, "data", should read --date--.

Signed and Sealed this

Fourteenth Day of August 1979

[SEAL]

Attest:

Attesting Officer

LUTRELLE F. PARKER
Acting Commissioner of Patents and Trademarks